June 12, 1951          C. S. BAUMAN, JR          2,556,250
APPARATUS FOR DRYING HYGROSCOPIC LIQUIDS
Filed July 31, 1946
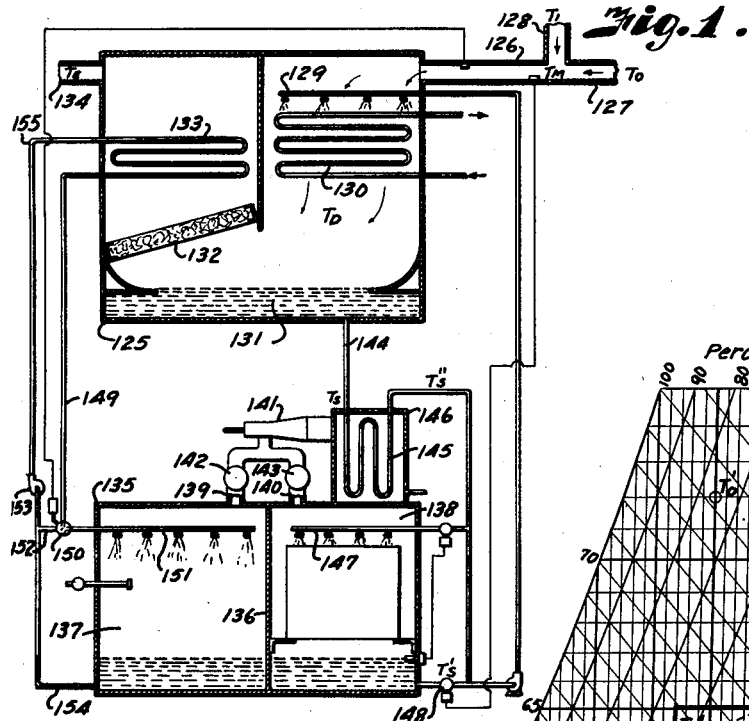
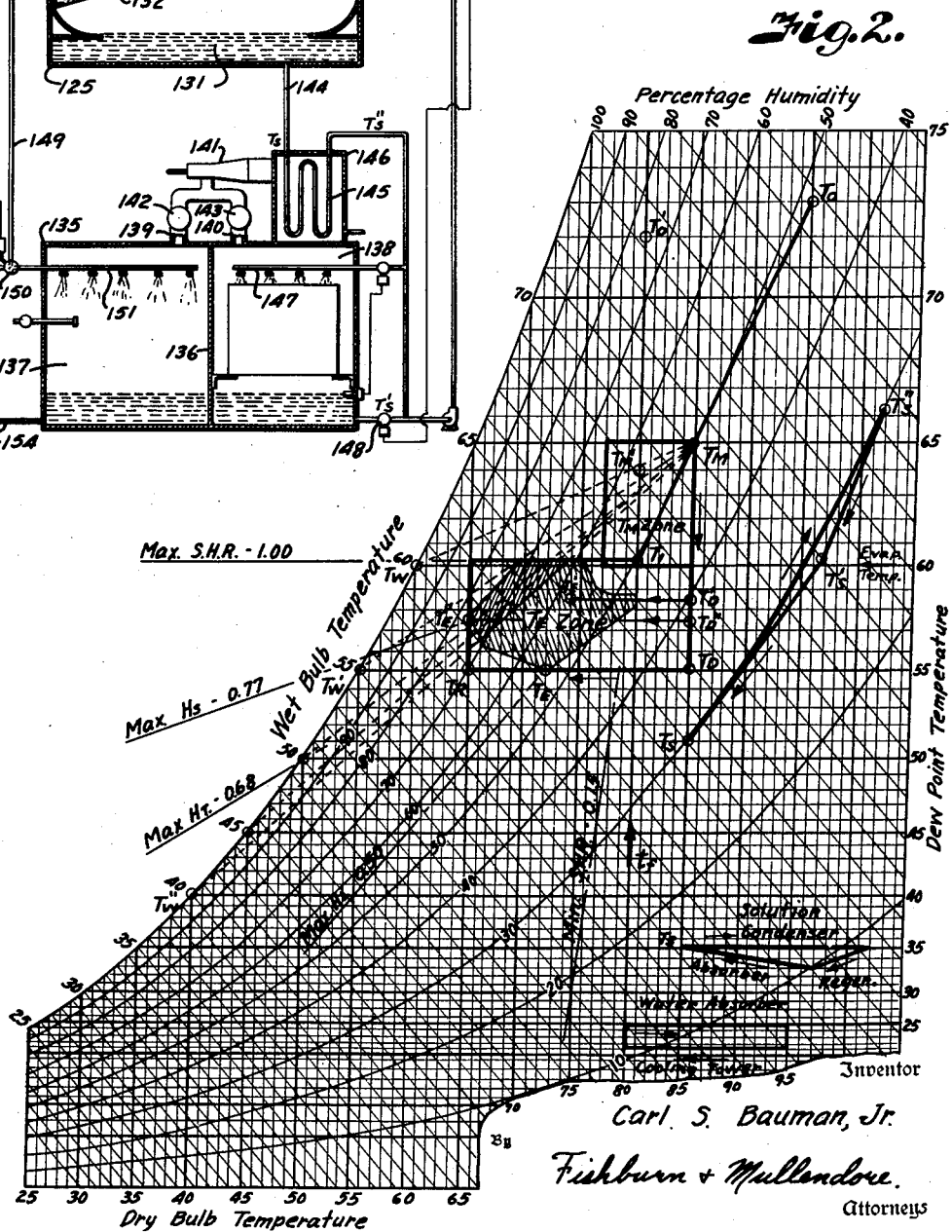
Inventor
Carl S. Bauman, Jr.
By Fishburn + Mullendore
Attorneys Patented June 12, 1951

2,556,250

UNITED STATES PATENT OFFICE 2,556,250

APPARATUS FOR DRYING HYGROSCOPIC LIQUIDS

Carl S. Bauman, Jr., Leavenworth, Kans., assignor to Texas Ice & Refrigerating Co., Fort Worth, Tex., a corporation of Texas Application July 31, 1946, Serial No. 687,400

1 Claim. (Cl. 159—3)

This invention relates to conditioning air and more particularly to a method and apparatus wherein air is chemically dried as by contacting the air with a liquid drying agent which is regenerated and recirculated in the system.

The principal object of this invention is to provide a method and simplified apparatus for conditioning air by means of a water vapor absorbing liquid medium such as an hygroscopic solution of suitable chlorides or glycols which may be used over again on recovery or reconcentration of the hygroscopic solution wherein the water vapor is expelled from the solution and said solution is again brought into contact with the air to dehumidify same. Other objects of the invention are to forcibly circulate air from and to an enclosure through a conditioning apparatus and for bleeding a portion of the air from the enclosure and mixing it with the air treated by the conditioning apparatus; to provide for mixing outside fresh air with the air from the enclosure prior to being conditioned; to provide for contacting the air to be dehumidified with an hygroscopic solution and recirculating said solution while bypassing a portion of the solution through a cooler and spraying another portion into a reduced pressure chamber for cooling and removing water vapor therefrom and mixing the cooled and reconcentrated solutions with the hygroscopic solution being recirculated; to provide for reconcentrating an hydroscopic solution that has picked up water vapor and heat from the air contacted therewith, by removing water vapor solution without supplying additional heat thereto; to provide for spraying the weak hygroscopic solution in a reduced pressure chamber wherein the rise in temperature of the solution in dehumidifying the air is used for the heat required in expelling water vapors from the solution to reconcentrate said solution, the temperature of said solution being above the boiling point of water at the pressure in the chamber; to provide an evaporation process for the regeneration and cooling of absorbing brines such as lithium chloride, calcium chloride, magnesium chloride, triethylene glycol, or other hygroscopic materials having similar properties for use in dehumidification and cooling of air by chemical drying or absorption; to provide a system of cooling air in which dehumidification and cooling of the air is individually controlled while a single source of power is utilized for effecting the cooling and dehumidification; and to provide a method and apparatus for air conditioning of simple and economical construction capable of being operated in an efficient manner to obtain more economical results than have heretofore been obtainable in methods and apparatus of this type.

Further objects and advantages of the invention will be apparent from the following description of the method and apparatus, reference being had to the accompanying drawing wherein the preferred form of the present invention is shown.

Fig. 1 diagrammatically illustrates apparatus embodying the invention, the air conditioning apparatus and hygroscopic solution reconcentrating and cooling apparatus being shown in vertical sections.

Fig. 2 is a psychrometric chart showing system function with specific conditions.

Referring more in detail to the drawing:

In the form of the apparatus shown in Fig. 1, 125 indicates an air conditioning apparatus having an inlet duct 126 supplied with outside air $T_o$ through a branch duct 127 and air $T_i$ from the enclosure being conditioned through a branch 128. The mixture $T_m$ of return air and outside air is directed into the housing 125 through a spray of hygroscopic liquid supplied by a spray header 129, said spray and air passing over a cooling coil 130 which is cooled by water from a cooling tower (not shown). The hygroscopic liquid is collected in a sump 131 at the bottom of the housing and the air is passed through a filter eliminator 132 and a water cooling coil 133 for removing excess moisture and further cooling of the air. The conditioned air $T_e$ is then delivered through an outlet duct 134 to a suitable fan or the like (not shown) for delivery to the enclosure to be conditioned.

The reconcentrator-chiller portion of the apparatus consists of a housing 135 having a partition 136 dividing the housing into separate compartments 137 and 138, said compartments being provided with conduits 139 and 140 connected with a suction device such as a steam jet booster 141 for reducing pressure in the respective compartment. The conduits 139 and 140 are provided with valves 142 and 143 respectively for controlling the effect of the suction device on the respective compartments.

Connected to the sump 131 is a pipe 144 having connection with a coil 145 in a condenser 146 where the temperature of the exhaust of the steam jet booster is used to increase the temperature of the hygroscopic liquid, the temperature of the liquid entering the condenser being indicated as $T_s$ and the temperature of the hygroscopic liquid leaving the condenser designated at T″s on the psychrometric chart. The liquid is delivered to a spray header 147 in the compartment 138 where it is sprayed into the reduced pressure area effecting evaporation of the water component in said hygroscopic solution. The reconcentrated liquid is then collected in the bottom of the compartment 138 and recirculated under control of a modulating valve 148 which is operated responsive to temperature Tm of the air mixture entering the air conditioning apparatus.

Water from cooling coil 133 is directed through a pipe 149 to a three-way valve 150 which is controlled responsive to temperature Tm of the air entering the air conditioning apparatus, for selectively directing the water to a spray header 151 in the compartment 137 on to a line 152 to a pump 153. The water sprayed in the compartment 137 is cooled by evaporation and collected in the bottom thereof. A line 154 connects the bottom of the compartment with the pump which pumps cool water through a line 155 to the cooling coil 133.

Conditions vary at different times of day due to changes in occupancy load, solar load, and variation of outside air conditions, therefore, air conditioning equipment must be designed to satisfy these conditions.

As illustrated on the psychrometric chart, Fig. 2, the five critical load conditions, maximum sensible heat, maximum total heat and maximum latent heat loads along with maximum sensible heat ratio and minimum sensible heat ratio are shown by the light and dark Te zone. Air must be conditioned for delivery to the space being conditioned whereby the characteristics of said air are plotted on the chart at any point within the Te zone if equipment is to maintain the inside temperature Ti of 80° D. B. and 50% relative humidity. Also the characteristics of the air indicated in the Te zone must be obtained from air having characteristics indicated by any point in Tm zone which covers the various conditions of mixed air, 33⅓% fresh air, To, and 66⅔% return, Ti, which takes care of outside temperature and humidity conditions. It can be seen that present methods using refrigeration and steam jet can only condition air to a point indicated by the dark shaded section, all other points must be reached by overcooling the air, such as to point Tr and heated to point Te. It must also be taken into consideration that refrigeration cooling of water to 40° requires an evaporation temperature of 35° maximum which calls for 1.16 B. H. P./ton. A steam jet booster operating at a condition to maintain 40° water will require 30 pounds of steam/hour/ton refrigeration. If the same booster is operated at 60° its capacity is 250% higher and the steam consumption per ton drops to approximately 15 pounds. It can be seen on the chart that water at 60° will cool air down the line Tm or T′m toward point Tw, water or coil surface temperature. Therefore, using 40° steam jet evaporation temperature as used now will only cover above 20% of required Te zone from Tm and from T′m less than 10% without overcooling and reheating.

The temperature and vapor pressure of the absorbing solution follows the line Ts—T″s closely to the curve of a relative humidity line, as dew point is a function of the vapor pressure, it can be seen that the solution whose characteristics follow Ts—T″s will permit a variance of vapor pressures or dew points. With the solution at Ts varying to T″s, this variation will deliver air off the absorber at some point on the line Tm—Td, its location depending on the Ts or solution temperature, such as Td, T′d and T″d to reach points Te, T′e and T″e. Variation of the temperature of the solution will effect a variation in the dew point of the air leaving the absorber. The sensible cooling of the temperature of the air leaving the absorber at some point on Tm—Td line to some Te temperature such as Te, T′e and T″e is governed by the water temperature in the cooling coil. A minimum temperature of water is maintained at maximum dew point temperature, the temperature Te of the air preferably varying from 64° D. B. to 80° D. B. and the water temperature varying from 55° to 60.2°.

In the temperature rise of the solution in the condenser, the rise Ts—T″s is 17°, 5° or (T″s—T′s) of this rise is used for heating the solution over the boiling point of 95° and only T′s—Ts is subjected to water in coil 130, therefore, 30% less water will be required for the stem jet condenser as part of the heat added to the solution is usable in the form of work in regeneration.

With 60° evaporator temperature in both sections of housing 135 all air having characteristics indicated in Tm zone can be conditioned to all characteristics in Te zone without over cooling and reheating.

T′o is an outside condition that occurs very frequently due to rains or fog and must be taken into consideration and the equipment must be designed for this type of load.

While I have particularly described my method and apparatus and a particular embodiment of my invention, it will be apparent to those skilled in the art that modifications may be made without departing from the spirit and scope of the invention.

What I claim and desire to secure by Letters Patent is:

An apparatus for reconcentrating and cooling an hygroscopic liquid and cooling water for use in contacting and cooling respectively of air in an air conditioning apparatus comprising, a housing having a partition therein dividing same into two closed juxtapositioned compartments, conduits connected with the upper portions of each compartment and having communication therewith, means including a steam jet booster connected with said conduits for communication with each of said compartments for simultaneously creating a reduced pressure therein, means in each of the conduits for regulating the proportion of the suction of the jet booster acting on the respective compartments, a condenser having connection with the exhaust of the jet booster, means for conducting diluted hygroscopic liquid from an air conditioning apparatus through the condenser in heat exchange relation with the booster exhaust for heating said liquid, means for spraying a portion of the heated hygroscopic liquid into one of the compartments of the housing whereby the reduced pressure therein effects evaporation of water vapor from said hygroscopic liquid to reconcentrate and cool same, said cooled reconcentrated hygroscopic liquid collecting in the bottom of said compartment, means for spraying water into the other compartment for cooling said water by evaporation at the reduced pressure, said cooled water collecting in said compartment, means for moving the cooled water from the respective compartment to an air conditioning apparatus for cooling air being conditioned therein, and means for delivering a mixture of the cooled reconcentrated hygroscopic liquid and heated hygroscopic liquid to the air conditioning apparatus for contacting air being conditioned therein.

CARL S. BAUMAN, JR.

REFERENCES CITED

The following references are of record in the file of this patent:

UNITED STATES PATENTS

| Number | Name | Date |
|---|---|---|
| 1,282,686 | Cammen | Oct. 22, 1918 |
| 1,711,614 | Passelecq | May 7, 1929 |
| 1,791,086 | Sperr | Feb. 3, 1931 |
| 2,027,093 | Downs | Jan. 7, 1936 |
| 2,090,287 | Cornelius | Aug. 17, 1937 |
| 2,095,386 | Hibberd | Oct. 12, 1937 |
| 2,114,787 | Smith | Apr. 19, 1938 |
| 2,129,299 | Bichowsky | Sept. 6, 1938 |
| 2,199,967 | Bichowsky | May 7, 1940 |
| 2,324,193 | Brunel | July 13, 1943 |
| 2,327,039 | Health | Aug. 17, 1943 |

FOREIGN PATENTS

| Number | Country | Date |
|---|---|---|
| 102,290 | Australia | Oct. 28, 1937 |
| 450,340 | Great Britain | July 15, 1936 |